(12) United States Patent
Reith et al.

(10) Patent No.: US 8,251,867 B2
(45) Date of Patent: Aug. 28, 2012

(54) METHOD FOR OPERATING A DRIVE TRAIN OF A VEHICLE

(75) Inventors: Ulrich Reith, Schlier (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 545 days.

(21) Appl. No.: 12/522,574

(22) PCT Filed: Jan. 25, 2008

(86) PCT No.: PCT/EP2008/050839
§ 371 (c)(1),
(2), (4) Date: Jul. 9, 2009

(87) PCT Pub. No.: WO2008/098824

PCT Pub. Date: Aug. 21, 2008

(65) Prior Publication Data
US 2010/0120582 A1 May 13, 2010

(30) Foreign Application Priority Data
Feb. 14, 2007 (DE) .................. 10 2007 007 257

(51) Int. Cl.
*H02P 17/00* (2006.01)
(52) U.S. Cl. .......... 477/15; 903/906
(58) Field of Classification Search .......... 477/3, 5, 477/7, 8, 15; 903/906, 930; 180/65.21, 65.285
See application file for complete search history.

(56) References Cited

U.S. PATENT DOCUMENTS

| | | | |
|---|---|---|---|
| 5,337,848 A * | 8/1994 | Bader | 180/65.25 |
| 6,712,734 B1 * | 3/2004 | Loeffler | 477/5 |
| 7,093,512 B2 * | 8/2006 | Ibamoto et al. | 74/339 |
| 7,094,176 B2 * | 8/2006 | Budal et al. | 477/5 |
| 7,503,876 B2 | 3/2009 | Kitamura et al. | |
| 2002/0033059 A1 | 3/2002 | Pels et al. | |
| 2007/0095584 A1 | 5/2007 | Roske et al. | |

FOREIGN PATENT DOCUMENTS

| | | |
|---|---|---|
| DE | 195 30 233 A1 | 2/1997 |
| DE | 199 01 414 A1 | 7/2000 |
| DE | 100 25 797 A1 | 5/2001 |
| DE | 101 33 695 A1 | 3/2002 |
| DE | 101 24 989 A1 | 12/2002 |
| DE | 10 2005 007 966 A1 | 10/2006 |
| DE | 10 2005 051 382 A1 | 5/2007 |
| DE | 10 2006 024 370 A1 | 12/2007 |
| DE | 10 2006 030 157 A1 | 1/2008 |
| DE | 10 2006 036 758 A1 | 2/2008 |
| EP | 1 548 332 A1 | 6/2005 |
| GB | 2 377 475 B | 2/2005 |
| WO | 2006/089669 A1 | 8/2006 |

* cited by examiner

*Primary Examiner* — Justin Holmes
(74) *Attorney, Agent, or Firm* — Davis & Bujold, P.L.L.C.

(57) ABSTRACT

A method for operating a drive train of a vehicle in which the drive train has at least an internal combustion engine, an engine clutch, an electric machine, a single and a multi-group manual transmission with synchronized and/or unsynchronized shift elements for shifting gears, an axle transmission, as well as an associated control device for controlling the gear shifts. It is provided for the purpose of expanding the functional possibilities, that the electric machine is used, during gear shifts in the manual transmission, as a mode of synchronization, a synchronization aid, or at least as a shifting aid such that changes in the direction of rotation of the transmission shafts are taken into consideration.

18 Claims, No Drawings

METHOD FOR OPERATING A DRIVE TRAIN OF A VEHICLE

This application is a National Stage completion of PCT/EP2008/050839 filed Jan. 25, 2008, which claims priority from German patent application serial no. 10 2007 007 257.2 filed Feb. 14, 2007.

FIELD OF THE INVENTION

The invention concerns a method for operating a drive train of a vehicle.

BACKGROUND OF THE INVENTION

The utilization of electric machines in drive trains of vehicles, in particular in motor vehicles, is already known. They can fulfill multiple functions, such as, for example, drive units in hybrid systems, auxiliary drives for all-wheel drives, gear drives for the realization of reverse gears, starter motors for internal combustion engines, starting aids, electrodynamic retarders, and pump drives for lubricating and cooling the oil supply or generators in recuperation devices. It is also known how to use electric machines for synchronization in manual transmissions, in order to be able dispense, at least in part, with the conventional synchronization devices with friction elements to obtain savings in productions costs and installation space, shorten the response times, and improve the shift comfort.

A drive train of such a motor vehicle as well as a method for its operation is known from DE 10 2005 007 966 A1. In it an electric motor is provided in a drive train arrangement in the force flow direction which consists of a combustion engine—engine clutch—electric motor—input shaft—manual transmission/manual transmission—axle transmission that can be used, among other things, for the synchronization of gear shifting in manual transmissions, whereby the electric motor brings about, for example, a synchronization speed between the transmission shaft and the gear wheel to be engaged before the respectively selected target gear is shifted. Also mentioned in this publication is that synchronization by means of an electric motor can be accomplished by several repeated productions of a synchronous speed in unsynchronized multigroup transmissions. A more detailed description of this is not found, however, in this publication.

The use of electric machines is also known in dual clutch transmissions. Described in the unpublished DE 10 2006 036 758.8 of the applicant is an automated dual clutch transmission in a countershaft transmission design having two transmission input shafts to which are allocated a group of gear wheel sets and a starting element, respectively, as well as shift elements configured as unsynchronized gear clutches. The two starting elements configured as dual clutch units are configured as unsynchronized engine clutches in a claw design. They are connected on the side of the transmission with an associated input shaft and can be alternatively connected on the input side to the crankshaft of an internal combustion engine. Either an electric machine whose rotor is engaged via a pinion gear to the fixed wheel of the highest gear of the respective gear group or a common electric machine which can alternatively be actively connected to the gear wheels, is associated with the two input shafts The electric machine acts as a starting and synchronization means. After the gear clutch of the starting gear of the vehicle is engaged by means of the electric machine during the starting operation, it is first accelerated until a synchronous speed of the input shaft has been reached at which the corresponding engine clutch can be engaged. During a gear change the input shaft of the target gear is first accelerated by means of the associated electric machine with the engine clutch of the target gear disengaged, until the gear clutch of the target gear can be engaged when a synchronous speed is reached, whereupon the electric machine temporarily absorbs the load that has built up until the engine clutch has disengaged the original gear, the original gear has been released, and the drive engine is controlled by a control mechanism to the new synchronous speed, so that the engine clutch of the target gear can then be engaged. Furthermore, a reverse gear can be realized by reversing the direction of rotation of the rotor of the electric machine of the at least one electric machine actively connected with a gear wheel set for a forward starting gear.

Known from DE 101 33 695 A1 is a dual clutch transmission in which at least one transmission input shaft can be connected to an electric machine. An acceleration can be achieved during a gear shift by means of the electric machine for a synchronization of the transmission input shaft or a speed reduction can be achieved by shifting down into the lowest gear. The electric machine can interact therein with the available synchronization devices.

The mentioned publications disclose a multitude of utilization possibilities for electric machines in vehicle drive trains, in particular for synchronization in conventional manual transmissions and dual clutch transmissions, and are able to fulfill their basic tasks to their full extent. It is disadvantageous, that the person skilled in the art can find no, or at least only insufficient, instructions concerning the mode of operation for the application of electric machines in problematic and/or comparatively complex gear shifts.

DETAILED DESCRIPTION OF THE PREFERRED EMBODIMENTS

Against this background the object of the invention is to disclose a method for operating a drive train of a vehicle and to further develop a drive train for this purpose in such a way, that the functional options of an electric machine allocated to the drive train, in particular for synchronization during gear shifts, are improved and expanded.

The invention is based on the realization, that irregular changes in the direction of rotation of transmission shafts can occur in manual transmissions, on the one hand, which make a gear shift impossible or at least difficult or delay it, and, on the other hand, that an electric machine in the drive can be operated in the drive train by means of a corresponding activation in both directions of rotation, so that the direction of rotation of this and/or other transmission shafts interacting with it can be influenced with the aid of this electric machine, whereby desired gear changes in specific operating situations can first be facilitated or at least synchronized such that the gear changes are improved.

The invention is based accordingly on a method for operating a drive train of a vehicle with an arrangement comprising at least an internal combustion engine, an engine clutch, an electric machine, a manual transmission for shifting gears in single group and multigroup design with synchronized and/or unsynchronized shift elements, an axle transmission, as well as an associated control device for controlling the gear shifts.

In order to attain the object, the invention provides that the electric machine is used as a synchronization means, a synchronization aid, or at least as a shifting aid during gear shifts in the manual transmission, whereby changes in the direction of rotation of the transmission shafts are taken into consideration.

The invention is also based on a drive train of a vehicle, comprising at least an internal combustion engine, an engine clutch, an electric machine, a manual transmission for shifting gears in single group or multigroup design with synchronized and/or unsynchronized shift elements, an axle transmission, as well as an associated control device for controlling the shifting operations. The invention also provides in this drive train, that the electric machine can be activated as a synchronization means, a synchronization aid, or at least as a shifting aid during a change in direction of rotation or one or several transmission shafts during a shift gear shift and can be actively connected to the affected transmission shafts via the positive locking connection means provided.

This drive train is particularly well suited for carrying out the inventive method in an appropriate vehicle.

A functional expansion for gear changes in manual transmissions in vehicle drive trains with electric machines is made advantageously available by means of this method. The method is basically suitable for all kinds of manual transmissions of a single or multi-group design with a single or dual clutch and one or several electric machines with a motor function and a generator function, if required, that is suitably controllable via a control device.

In a particularly advantageous application of the method, it can be provided, that during a change in direction of rotation of a transmission output shaft caused by undesirable rolling of the vehicle contrary to a selected gear or travel direction, the direction of rotation of at least another transmission shaft, which is to be correlated with the transmission output shaft, is first adapted to the transmission shaft running in the original direction of rotation by means of the electric machine.

A scenario such as this occurs relatively frequently in off-road applications, when the vehicle drives on a steep uphill grade and rolls back, while the manual transmission is in neutral position during the course of a gear change, whereby the transmission output shaft connected to the drive wheels changes its direction of rotation. A comparable scenario for startup processes, in particular with heavy utility vehicles, is also described in the unpublished DE 10 2006 030 157.9 of the applicant.

A change in direction of rotation of the transmission output shaft can make difficult the engagement of a gear in manual transmissions with a synchronization device, whereby at least an increased load on the synchronous components in question occurs. In transmissions without a synchronization device it is rather possible, that the gear wheel to be engaged cannot be synchronized at all and an engagement of the selected target gear is rendered impossible. As a consequence, the vehicle must first be brought to a standstill, in order to then induce a startup process or a renewed startup process.

In an operating state such as this which is inherently irregular, the electric machine can likewise reverse the direction of rotation of the shafts to be correlated which run in the original direction within the shortest time using the method according of the invention, whereby synchronization which is gentle on the components is made possible in transmissions with synchronous components. It could be possible to intercept the vehicle by engaging the engine clutch and reversing the direction of travel of the vehicle in the selected direction during a temporary decrease in speed of the internal combustion engine, at least as long as a clutch load produced therein remains within an allowed range. In transmissions without synchronous components, the electric machine could first facilitate the shifting of a gear in such a situation without having to brake the vehicle to a standstill.

The electric machine is advantageously used further in particular for synchronization in a multigroup transmission, for example, in a three-group transmission with a split group connected upstream, a central main group, and a range group connected downstream, and can be controlled for a reversal in direction of rotation by means of shafts running in the original direction during a change in the direction of rotation. The basic design of these three transmission groups—without an electric machine—is known, for example, from the unpublished DE 10 2006 024 370.6 of the applicant.

Transmission synchronization is carried out herein comparatively fast within the groups using the electric machine, so that overall very quick shift times can be achieved and conventional synchronization devices can be omitted even in all groups which provides particular savings in costs and installation room. It is basically also possible to configure only one or two groups without synchronous elements or to connect the electric machine as an additional synchronization aid in a completely synchronized transmission, for example, for reversal of the direction of rotation of the shafts to be correlated with the transmission output shaft during an irregular change in direction of rotation with a corresponding current feed and rotor direction of rotation of the electric machine.

A serial shift sequence can be provided in the simplest case, in which a load reduction initially takes place with the disengagement of the engine clutch and engagement of the original gear, then the individual groups are respectively disengaged, synchronized by means of the electric machine, and engaged again, and finally an engagement of a target gear takes place with the engagement of the engine clutch and a load increase, whereby the following steps are carried out separately in a three-group transmission:

Load decrease with the disengagement of the engine clutch and engagement of the original gear,
Disengagement of the split group,
Synchronization of the split group,
Engagement of the split group,
Disengagement of the main group,
Synchronization of the main group,
Engagement of the main group,
Disengagement of the range group,
Synchronization of the range group,
Engagement of the range group,
Engagement of a target gear with the engagement of the engine clutch and load increase.

Meant in terms of drive technology under engagement and disengagement of the respective partial drive is the coupling or decoupling thereof in or out of the joint drive train.

Since the shift directions within the groups can differ in a gearshift assembly in a multigroup transmission during a gear change, that is, a downshift can take place in one or several other groups instead of an upshift, but an upshift can take place instead in one or several other groups, it is particularly advantageous to proceed according to predetermined criteria, in order to achieve an effective shift sequence with a particularly short shift time and to accordingly activate the engine clutch, the electric/hydraulic/pneumatic shift elements to be shifted, and the electric machine via a transmission control.

Provided as practical criteria for an optimal shift sequence in this regard are:

A number of reversals in direction of rotation of transmission shafts to be carried out by means of the electric machine,
The magnitude of a speed range to be respectively synchronized by means of the electric machine, The magnitude of a respective speed jump, The direction of a respective speed jump, and The speed level itself.

Accordingly a shift sequence is advantageously carried out in such a way, that as few as possible reversals in direction of rotation take place and/or the synchronization ranges for the electric machine are as small as possible and/or the greatest possible decreasing speed jump is synchronized first, that is, the groups with an upshift are synchronized with priority and engaged, and/or the synchronizations are carried out with the lowest possible speed level.

It can additionally be provided, that the engine clutch is selectively engaged, either completely or partially, or remains completely or partially engaged with specific synchronizations, whereby the shift comfort can be increased. This is particularly advantageous with upshifts, whereby the internal combustion engine is synchronized together with the positive/non-positive connection via the slipping or engaged engine clutch.

Consecutively engaged and disengaged phases of the groups of the multigroup transmission during a shift sequence can be selectively separated from each other or can take place at overlapping times for a further shift time improvement.

Tooth-on-tooth conditions of gears to be shifted can occur during shift sequences in such manual transmissions. In order to prevent adverse effects on the force flow in the manual transmission and an increase of the shift security and to continue engaging in a suitable way when tooth-on-tooth conditions occur, that is, in the corresponding group of the multigroup transmission, the electric machine continues to be controlled and operated or is controlled and operated in a different way, until the corresponding gears are regularly engaged and the respective tooth-on-tooth condition has been eliminated.

In summary, it can be formulated, that a driving operation which is particularly gentle on the transmission with increased shift security can be achieved during unintentional forward or rearward rolling during travel by means of the invention with a shift into a single group or multigroup transmission or during a startup procedure with engagement of a start gear in which at least one transmission shaft changes its direction of rotation, preferably by means of a reversal in direction of rotation of the shafts running in the original direction, with the aid of the electric machine, whereby the shift sequence by means of a fast synchronization requires only a comparatively very short shift time, so that the vehicle can be intercepted by means of the engine or start clutch during gear change or directly thereafter.

The method is explained in the following based on the example of a multigroup transmission without synchronization (or at least with an unsynchronized main group), such as, for example, a twelve-gear transmission of the known "ZF-AS Tronic" type series of the applicant, with a two-gear split group (GV) and a three-gear central main group (HG) in a countershaft design connected upstream, as well as a two-gear range group (GP) in planetary design connected downstream. A transmission of this kind and its mode of operation, as well as the arrangement of an electric machine operable as generator in a drive train, is known to the person skilled in the art. A detailed description of the transmission is omitted herein for this reason, and only a gear shift with a change in direction of rotation of a transmission shaft is described in more detail as an example of the method according to the invention.

A gear shift from the $6^{th}$ forward gear as the original gear into the $7^{th}$ forward gear as the target gear is assumed for this purpose. A downshift results therein for the main group (HG) and the split group (GV) and an upshift results for the range group (GP).

Accordingly the gear change from the $6^{th}$ gear into the $7^{th}$ gear can proceed as an example according to the following three methods, taking into consideration the above-explained criteria, whereby it is started with the upshifting range group and the adjacent engaged and disengaged phases can take place advantageously in overlapping manner:

I. Shift sequence:
1. Load decrease with the disengagement of the engine clutch,
2. Range groups GP:
   i. Disengaging,
   ii. Synchronizing, the speed of the electric machine decreases due to the upshift,
   iii. Engaging,
3. Main group HG:
   i. Disengaging,
   ii. Synchronizing, the speed of the electric machine increases due to the downshift,
   iii. Engaging,
4. Split group GV:
   i. Disengaging,
   ii. Synchronizing, the speed of the electric machine increases due to the downshift,
   iii. Engaging,
5. Engage engine clutch and load increase, the speed of the internal combustion engine decreases temporarily due to the non-positive connection.

II. Shift sequence:
1. Load increase with the disengagement of the engine clutch,
2. Range group GP:
   i. Disengaging,
   ii. Synchronizing, the speed of the electric machine decreases due to the upshift,
   iii. Engaging,
3. Main group HG:
   i. Disengaging,
   ii. Synchronizing, the speed of the electric machine increases due to the downshift,
4. Engine clutch partial engagement, the speed of the internal combustion engine decreases and is synchronized,
5. Main group:
   i. Engaging,
6. Split group GV:
   i. Disengaging,
   ii. Synchronizing, the speed of the electric machine increases due to the downshift,
   iii. Engaging,
7. Engine clutch remaining engaged and load increase.

III. Shift sequence:
1. Load increase with disengagement of the engine clutch,
2. Range group GP:
   i. Disengaging,
   ii. Synchronizing, the speed of the electric machine decreases due to the upshift,
   iii. Engaging,
3. Main group HG:
   i. Disengaging,
   ii. Synchronizing, the speed of the electric machine increases due to the downshift,
   iii. Engaging, 4. Split group GV:
   i. Disengaging,
   ii. Synchronizing, the speed of the electric machine increases due to the downshift,
5. Engine clutch partial engagement, the speed of the internal combustion engine decreases and is synchronized,
6. Split group:
   i. Engaging,
7. Engine clutch remaining engaged and load increase.

The invention claimed is:

1. A method of operating a drive train of a vehicle comprising at least an internal combustion engine, an engine clutch, an electric machine, either a single group or a multi-group manual transmission for shifting gears with at least one of synchronized and unsynchronized shift elements, an axle transmission, and an associated control device for controlling the gear shifts, the method comprising the steps of:
   using the electric machine to one of synchronize, assist with synchronization of and assist with shifting of the shifting gears in the manual transmission such that changes in a direction of rotation of transmission shafts of the transmission is taken into consideration: and
   if a first transmission shaft is rotating in an unintended direction, rotating a second transmission shaft in the same unintended direction such that the second transmission shaft synchronizes with the first transmission shaft.

2. The method of claim 1, further comprising the step of adjusting the direction of rotation of the transmission shafts from a start by the electric machine such that rotation of the transmission shafts correlates and is in the same direction.

3. The method of claim 1, further comprising the step of adapting the direction of rotation, with the electric machine, of at least one other transmission shaft, which is to be correlated with a transmission output shaft and running in the original direction of rotation, to the direction of rotation of the transmission output shaft, if a change in the direction of rotation of a transmission input shaft is caused by an undesirable rolling of the vehicle contrary to a selected gear direction.

4. The method of claim 1, further comprising the step of selectively engaging the engine clutch, either completely or partially, or retaining complete or partial engagement of the engine clutch during predetermined synchronizations.

5. The method of claim 1, further comprising the step of synchronizing the second shaft to the first shaft without braking the vehicle substantially to a standstill.

6. The method of claim 1, further comprising the step of providing a planetary gear set within the drive train of the vehicle.

7. The method of claim 1, further comprising the step of, if the vehicle is rolling in a direction opposite to an intended direction, synchronizing the first transmission shaft with a transmission output shaft.

8. The method of claim 1, further comprising the step of changing the direction of rotation of at least one of the transmission shafts.

9. The method of claim 1, further comprising the step of synchronizing the second transmission shaft with the first transmission shaft at least partially by use of the electric machine.

10. The method of claim 1, further comprising the step of using a transmission output shaft as the second transmission shaft and rotating a transmission output shaft such that the transmission output shaft synchronizes with the first transmission shaft.

11. The method of claim 1, further comprising the step of synchronizing the second transmission shaft with the first transmission shaft while the engine clutch is disengaged.

12. The method of claim 1, further comprising the step of synchronizing separate groups of the multi-group transmission having at least partially unsynchronized shift elements with the electric machine during the control of the shift sequences, taking into consideration changes in the direction of rotation of the transmission shafts.

13. A method of operating a drive train of a vehicle comprising at least an internal combustion engine, an engine clutch, an electric machine, either a single group or a multi-group manual transmission for shifting gears with at least one of synchronized and unsynchronized shift elements, an axle transmission, and an associated control device for controlling the gear shifts, the method comprising the steps of:
   using the electric machine to one of synchronize, assist with synchronization of and assist with shifting of the shifting gears in the manual transmission such that changes in a direction of rotation of transmission shafts of the transmission is taken into consideration: and if a first transmission shaft is rotating in an unintended direction, rotating a second transmission shaft in the same unintended direction such that the second transmission shaft synchronizes with the first transmission shaft.

14. The method of claim 12, further comprising the step of successively separating engagement and disengagement phases of groups of a multi-group transmission of overlapping the engagement and disengagement phases during a shift sequence.

15. The method of claim 12, further comprising the step of continuing the gear shift when tooth-on-tooth conditions occur, whereby the electric machine in the corresponding group of them multigroup transmission continues to be controlled and operated or is controlled and operated in a different way, until the corresponding gears are regularly engaged and the respective tooth-on-tooth condition has been eliminated.

16. The method of claim 12, further comprising the step of performing a gear change in a series shift sequence in the multi-group transmission with unsynchronized shift elements, by increasing a load by disengaging the engine clutch and releasing an original gear, respectively disengaging individual groups, synchronizing with the electric machine. and engaging a target gear with the engine clutch and increasing the load.

17. The method of claim 16, further comprising the step of performing the gear change with the following steps in a three-group transmission with a split group connected upstream, a central main group, and a range group connected downstream:
   a) decreasing the load by disengaging the engine clutch and the original gear,
   b) disengaging the split group,
   c) synchronizing the split group,
   d) engaging the split group,
   e) disengaging the main group,
   f) synchronizing the main group,
   g) engaging the main group,
   h) disengaging the range group,
   I) synchronizing the range group,
   j) engaging the range group,
   k) engaging the target gear with engagement of the engine clutch and increasing the load.

18. A method of operating a drive train of a vehicle comprising at least an internal combustion engine, an engine clutch, an electric machine, an axle transmission, a control device for controlling gear shifts in a manual transmission having a split group, a main group, a range group and shift elements, the method comprising the steps of:
considering a plurality of predetermined criteria when controlling the shift elements during a gear shift in the manual transmission from an original gear to a target gear with the predetermined criteria comprising:
a number of reversals in direction of rotation of transmission shafts to be carried out by the electric machine;
a magnitude of a speed range to be synchronized by the electric machine; a magnitude of a speed jump;
a direction of the speed jump; and
a speed level;
decreasing a load on the original gear by disengaging the engine clutch;
disengaging the split group;
synchronizing the split group;
engaging the split group;
disengaging the main group;
synchronizing the main group;
engaging the main group;
disengaging the range group;
synchronizing the range group;
engaging the range group;
engaging the target gear; and
engaging the engine clutch to increasing a load on the target gear.

* * * * *